(12) United States Patent
Fan

(10) Patent No.: US 6,641,159 B1
(45) Date of Patent: Nov. 4, 2003

(54) COMPOUND DRIVE FOLDABLE BICYCLE

(76) Inventor: Jeeng-Neng Fan, No. 34, Alley10, Lane54, Sec.2, Yangsin Rd., Yang mei, Taoyuan (TW)

( * ) Notice: Subject to any disclaimer, the term of this patent is extended or adjusted under 35 U.S.C. 154(b) by 0 days.

(21) Appl. No.: 10/282,117

(22) Filed: Oct. 29, 2002

(51) Int. Cl.[7] .............................................. B62K 15/00
(52) U.S. Cl. ........................ 280/278; 280/261; 280/287
(58) Field of Search ................................ 280/287, 278, 280/259, 260, 261, 231, 236

(56) References Cited

U.S. PATENT DOCUMENTS

| | | | | |
|---|---|---|---|---|
| 846,033 | A | * 3/1907 | Kidney | 280/261 |
| 1,535,714 | A | * 4/1925 | Burke | 280/261 |
| 3,834,734 | A | * 9/1974 | Chiappetti | 280/261 |
| 4,182,522 | A | * 1/1980 | Ritchie | 280/278 |
| 4,202,561 | A | * 5/1980 | Yonkers | 280/278 |
| 5,441,290 | A | * 8/1995 | Morgan et al. | 280/259 |
| 5,836,602 | A | * 11/1998 | Wang | 280/287 |
| 5,873,590 | A | * 2/1999 | Abe et al. | 280/259 |
| 6,279,935 | B1 | * 8/2001 | Wagner | 280/287 |

FOREIGN PATENT DOCUMENTS

EP 0505598 * 9/1992

* cited by examiner

*Primary Examiner*—Anne Marie Boehler
(74) *Attorney, Agent, or Firm*—Rosenberg, Klein & Lee

(57) ABSTRACT

A compound drive foldable bicycle consisting of a bicycle in an unfolded state having a length between the outer edges of a front and a rear wheel that is divided into three sections such that the rear wheel is swung up and down into the unfolded and folded state on a second drive shaft that serves as a pivot point, while the front wheel is horizontally swung into the folded and folded state via a foldable locking mechanism that serves as a pivot point and which is positioned on the down tube (or the top tube) and, furthermore, situated within the circumferential perimeter of the chainring. As a result, the rear wheel is postured at the lower extent of the chainring and front wheel is postured at the lower extent of the saddle when the bicycle is in the folded state such that it is of the smallest and most flexible physical dimensions to save space and reduce packaging material requirements, thereby facilitating storage, placement, and shipping.

3 Claims, 13 Drawing Sheets

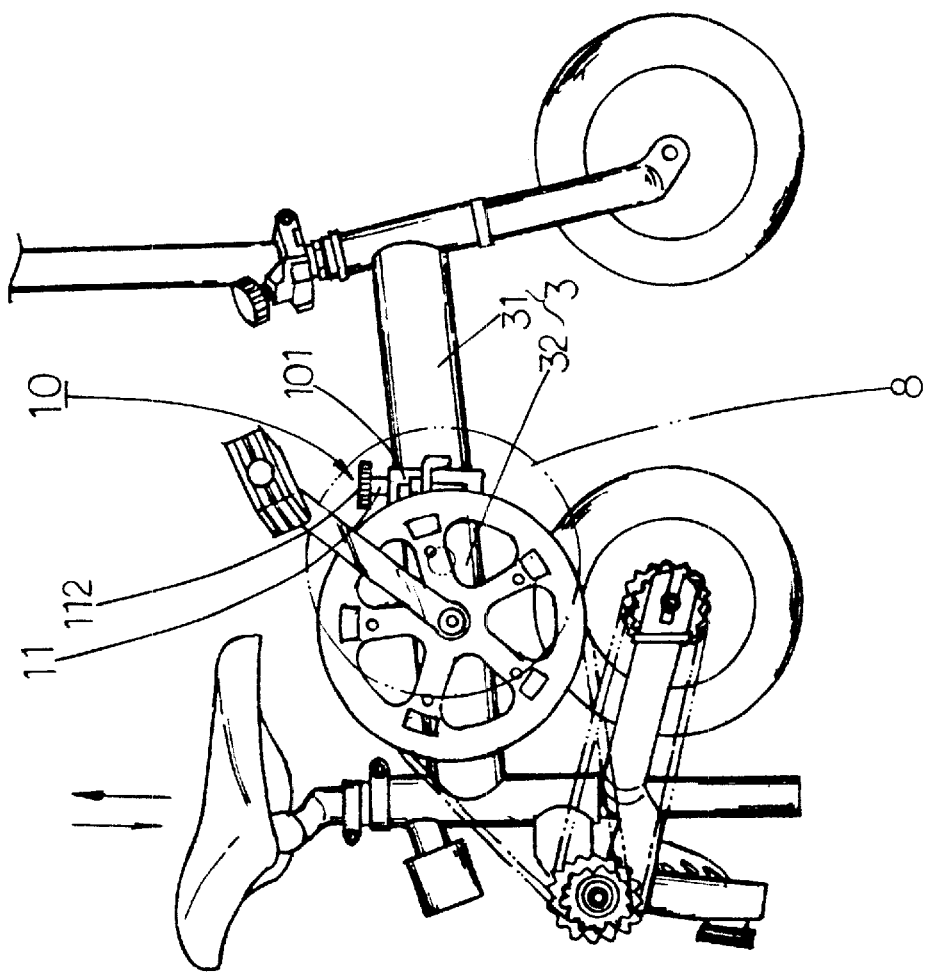
FIG.9
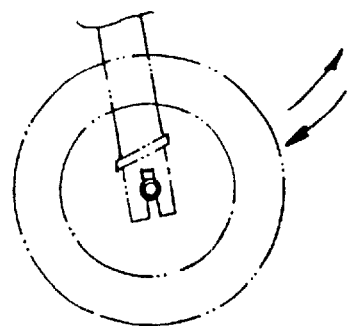

COMPOUND DRIVE FOLDABLE BICYCLE

BACKGROUND OF THE INVENTION

1) Field of the Invention

The invention herein relates to bicycles, specifically a compound drive foldable bicycle.

2) Description of the Prior Art

Available in range differing structural arrangements, foldable bicycles essentially consist of a foldable locking device situated next to the crankarm mounting area that enables the unfolding and folding of the bicycle frame, thereby reducing the overall physical size of the bicycle to facilitate portability, shipping, and storage. As indicated in FIG. 1, the said foldable locking device 10 that provides for the unfolding and folding of the bicycle frame is generally disposed on the down tube 3 (or the top tube) in front of the crankarm mount 2 and functions as a pivot point on the down tube 3 (or the top tube) that enables the front wheel 4 to be unfolded forward into the state of utilization or folded backward into the state of non-utilization. That is, the physical size of the said bicycle is lessened by utilizing the down tube 3 (or the top tube) to fold the front wheel 4 rearward to the seatstays 5 and the chainstays 6, wherein the distance b between the said rear wheel axle 71 and the crankarm mount 2 remains totally unchanged.

Referring to FIG. 2, the structure of the said foldable locking device 10 is comprised of a female connector 101, a male connector 102, and a quick release handle 103, wherein the said female connector 101 and male connector 102 are respectively disposed at the anterior and the posterior sections 31 and 32 of the down tube 3 (or the top tube), with a locating pin 100 inserted to maintain them in a free swinging state; the said quick release handle 103 is installed to the male connector 102 by means of an adjustment screw 1031 that is capable of coupling the male and female connector 102 and 101. When the bicycle frame down tube 3 (or top tube) is unfolded, the said male and female connector 102 and 101 are brought into union and the said quick release handle 103 adjustment screw 1031 is horizontally guided into the locating notch 1011 at the exterior side of the female connector 101, thereby tensively nesting the handle 103 to effectively secure the coupling of the said male and female connector 102 and 101 and, furthermore, the anterior and the posterior sections 31 and 32 of the down tube 3 (or top tube) enable folding as required by the bicycle-use situation. After the quick release handle 103 is released, the adjustment screw 1031 is horizontally moved out of the female connector 101 locating notch 1011 to decouple the said male and female connector 102 and 101, following which the anterior and the posterior sections 31 and 32 of the down tube 3 (or the top tube) are folded by means of the locating pin 100 that functions as a pivot point, enabling the bicycle to be configured into the folded state as required.

Although utilizing the foldable locking device 10 as a pivot point to fold the front wheel 4 and down tube 3 towards the rear when the bicycle is not in use effectively reduces its overall physical size and, furthermore, virtually all currently available foldable bicycles have adopted such a method, the inventor of the invention herein realized following long-term usage that there are still several shortcomings that require further improvement, including:

(1) When folded, only the down tube 3 and the front wheel 4 are folded to the rear and the position of the rear wheel 7 at the other extremity of the bicycle frame remains unchanged and given that the distance b between the said rear wheel axle 71 and the crankarm mount 2 is typically of a definite proportion that cannot be too short (bicycle handling and comfort is adversely affected if the distance b is too long or too short), resulting in the drawback that the extent to which folding the down tube 3 and the front wheel 4 rearward for a decrease in overall physical size is limited by the said condition and cannot be further reduced.

(2) Since the coupling and decoupling of the said male and female connector 102 and 101 necessitates the turning of the quick release handle 103 at one side (the side opposite the locating pin 100) of the male and female connector and, furthermore, the down tube 3 (or the top tube) is typically folded towards the side of the chainring 8 (in the direction of the locating pin 100) to prevent hitting the chainring 8 when the bicycle frame down tube 3 (or top tube) is folded because the said quick release handle 103 is situated on the same side as the chainring 8, to facilitate turning it without hazardously impacting the chainring 8, virtually all said male and female connectors 102 and 101 (i.e., foldable locking devices) are usually installed at the anterior extent, upper extent, or lower extent (generally the upper or anterior extent ) of the chainring 8 and thus cannot be placed adjacent to the crankarm mount (the center of the chainring), the folded length and height of the said bicycle frame is subject to limitations and the smallest, most space-saving dimensions cannot be achieved and, at the same time, the design of the bicycle frame is also limited in that additional flexibility and variation is not possible.

(3) After the said male and female connector 102 and 101 are brought into union, since the said quick release handle 103 adjustment screw 1031 must be horizontally guided into the locating notch 1011, with the quick release handle 103 then nested under tension to achieve secure coupling, in addition to the relatively troublesome operation involved, notably because the said quick release handle 103 necessarily involves the application of considerable force to solidly couple the said male and female connector 102 and 101, the quick release handle 103 requires much strength to operate and, as such, has the shortcomings of exhaustive physical effort and attendant inconveniences.

(4) Since the said quick release handle 103 adjustment screw 1031 is horizontally guided into the locating notch 1011 formed in the female connector 101, if the tensive nesting of the quick release handle 103 is inadequate and the bicycle is ridden on roughly surfaced road, the said adjustment screw 1031 becomes dislodged and results in the dangerous separation of the anterior and the posterior sections 31 and 32 of the down tube 3 (or the top tube).

(5) Since the said adjustment screw 1031 of the said quick release handle 103 is horizontally articulated for engagement of the female connector 101 and disengagement of the female connector 101, the stance of the operator relative to the horizontally oriented quick release handle 103 is typically not within a natural angle of vision and conflicts with common working practices and, thus, does not comply with ergonomic principles of operation.

Based on the preceding section, the folding method of the said conventional foldable bicycle is obviously still unperfected and has numerous shortcomings that require further improvement.

SUMMARY OF THE INVENTION

The primary objective of the invention herein is to provide a compound drive foldable bicycle in which the bicycle in an unfolded state has a length between the outer edges of a front and a rear wheel that is divided into three sections such that the said rear wheel is swung up and down into the unfolded and folded state on a second drive shaft that serves as a pivot point and, furthermore, the rear wheel is postured at the lower extent of the chainring when it is folded, while the front wheel is horizontally swung for unfolding and folding via a foldable locking mechanism positioned on the down tube (or the top tube) and situated within the circumferential perimeter of the chainring such that the front wheel is postured at the lower extent of the saddle; as such, when the bicycle is in the folded state, it is of the smallest and most flexible physical dimensions to save space and reduce packaging material requirements, thereby facilitating storage, placement, and shipping.

Another objective of the invention herein is to provide a compound drive foldable bicycle, wherein the foldable locking mechanism that provides for the unfolding and folding of the front wheel by horizontal swinging is situated within the circumferential perimeter of the said chainring adjacent to its crankarm mounting area such that the folded length and height of the said bicycle frame is not only the smallest possible, but at the same time the design of the frame can be flexibly reshaped, adapted, and modified in a multiple variety of ways.

Yet another objective of the invention herein is to provide a compound drive foldable bicycle, wherein the said foldable locking mechanism has an adjustment screw that enables its unfolding and folding which is situated at the exact upper extent of a female connector and when rotated, a latch bolt accordingly ascends or descends to decouple and couple a male connector and the female connector; as such, the folding and unfolding of the said bicycle meets the requirements of ergonomic and natural operation, while the said unfolding and folding is reliable, solid, and stable, thereby precluding any possibility of hazardous slippage and separation.

BRIEF DESCRIPTION OF THE DRAWINGS

FIG. 9 is an orthographic drawing of the foldable locking mechanism of the invention herein as situated within the circumferential perimeter of the chainring.

DETAILED DESCRIPTION OF THE INVENTION

Figure 1:
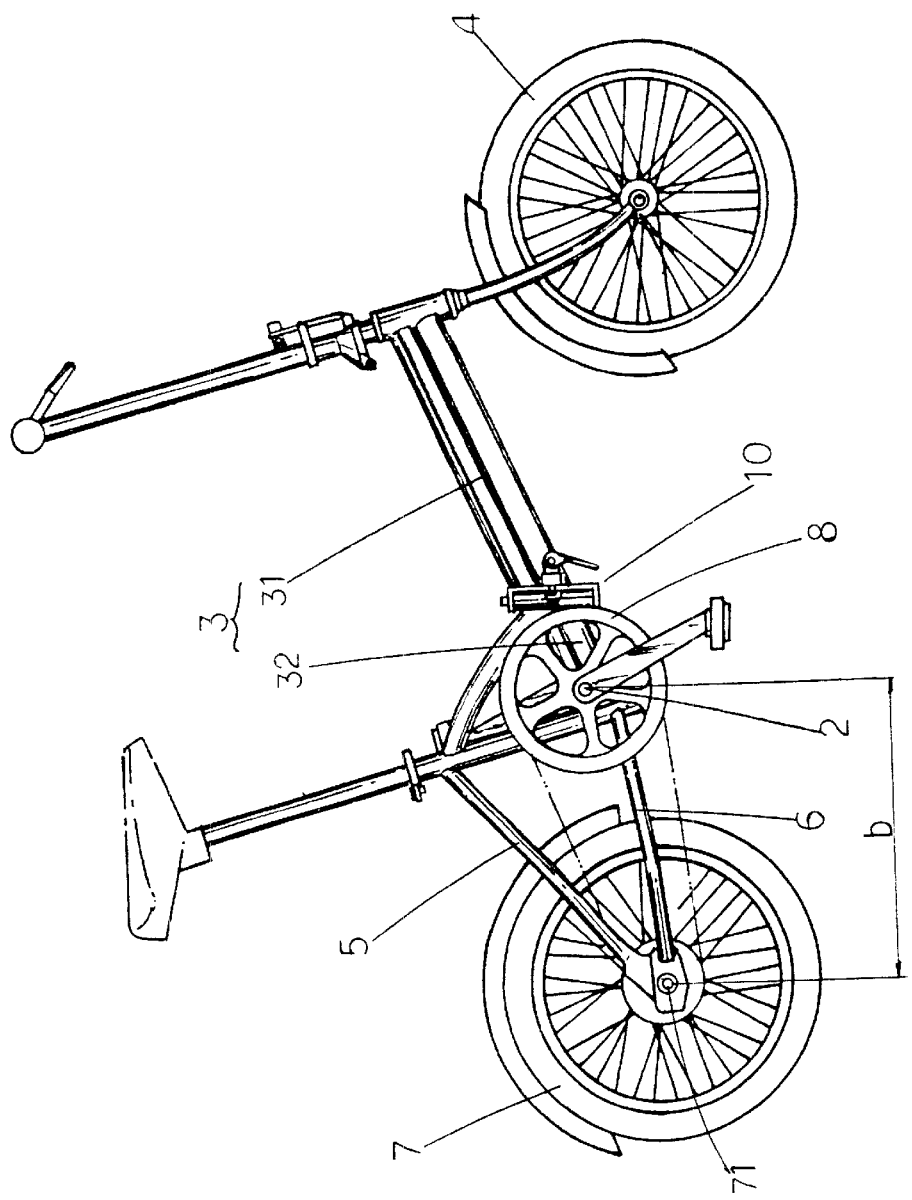
FIG. 1 is an orthographic drawing of a conventional foldable bicycle.
Figure 2:
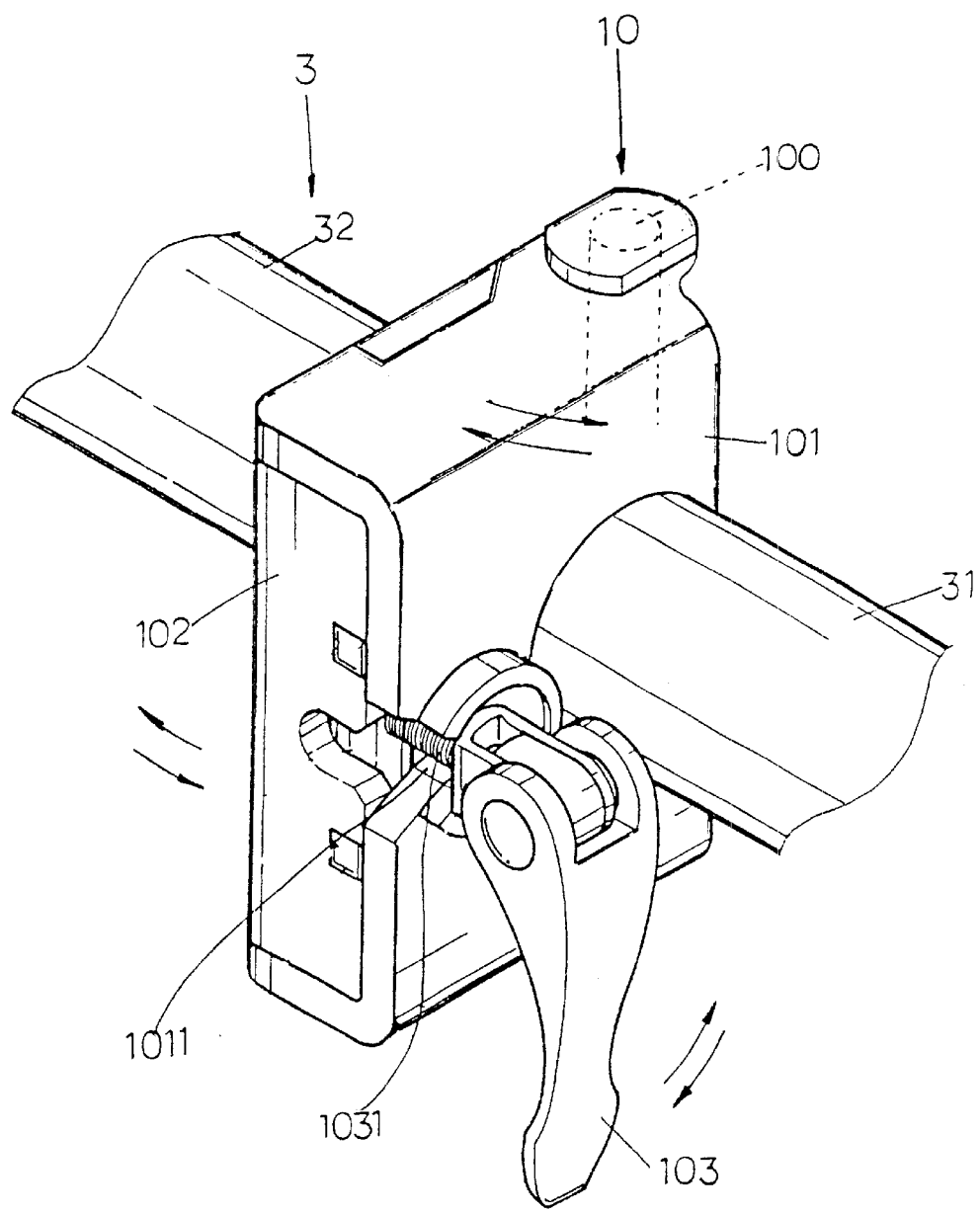
FIG. 2 is an isometric drawing of a conventional foldable locking device.
Figure 3:
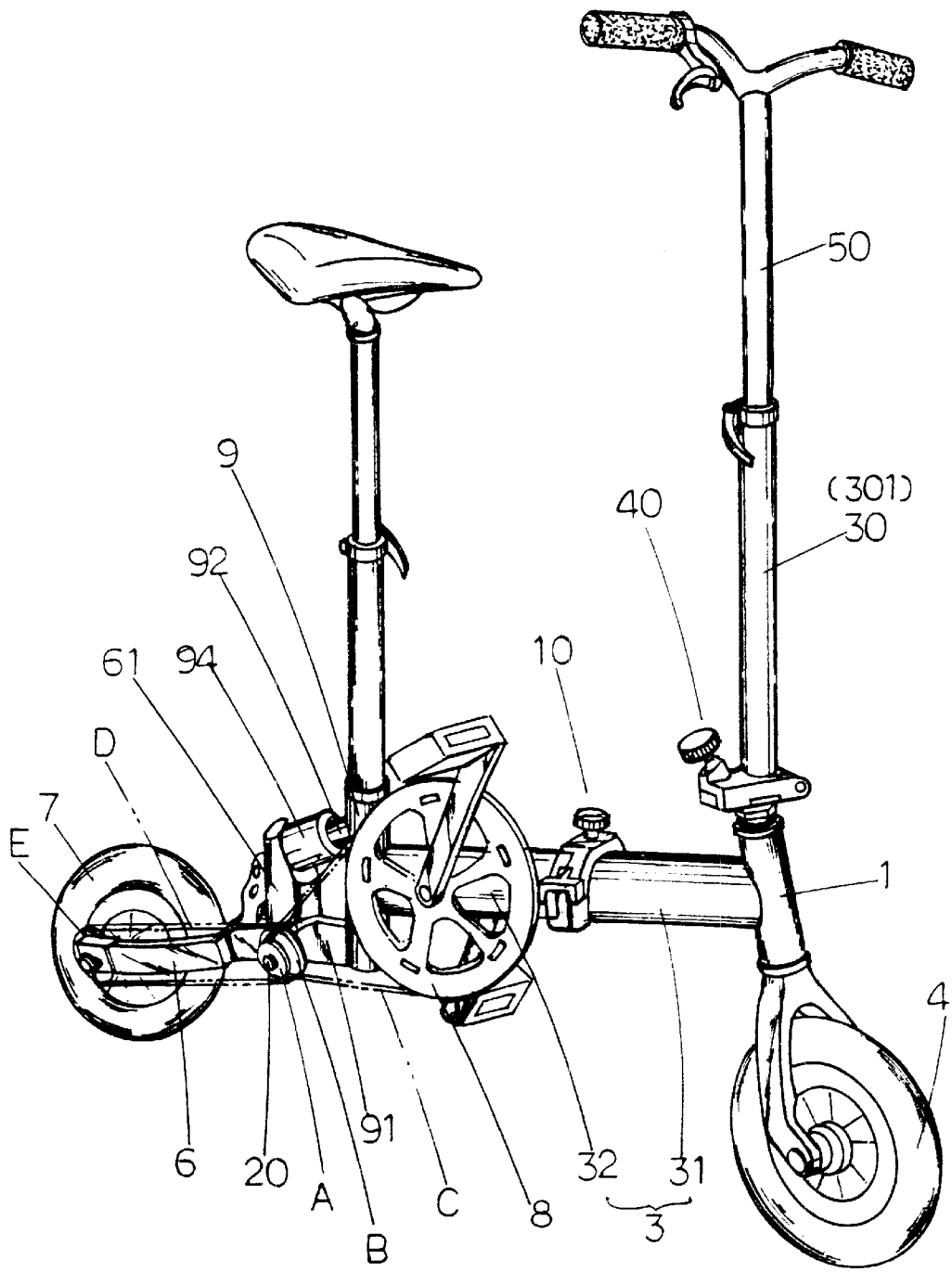
FIG. 3 is an isometric drawing of the invention herein.

Referring to FIG. 3, the compound drive foldable bicycle of the invention herein consists of a bicycle in an unfolded state having a length between the outer edges of a front and a rear wheel 4 and 7 that is divided into three sections, wherein the said rear wheel 7 is swung up and down into the unfolded and folded state on a second drive shaft 20 that serves as a pivot point, with the said rear wheel 7 and the said front wheel 4 horizontally swung along with a extension pipe 30 into the folded and folded state via a foldable locking mechanism 10 positioned on a down tube 3 (or a top tube) that serves as a pivot point.

Figure 4:
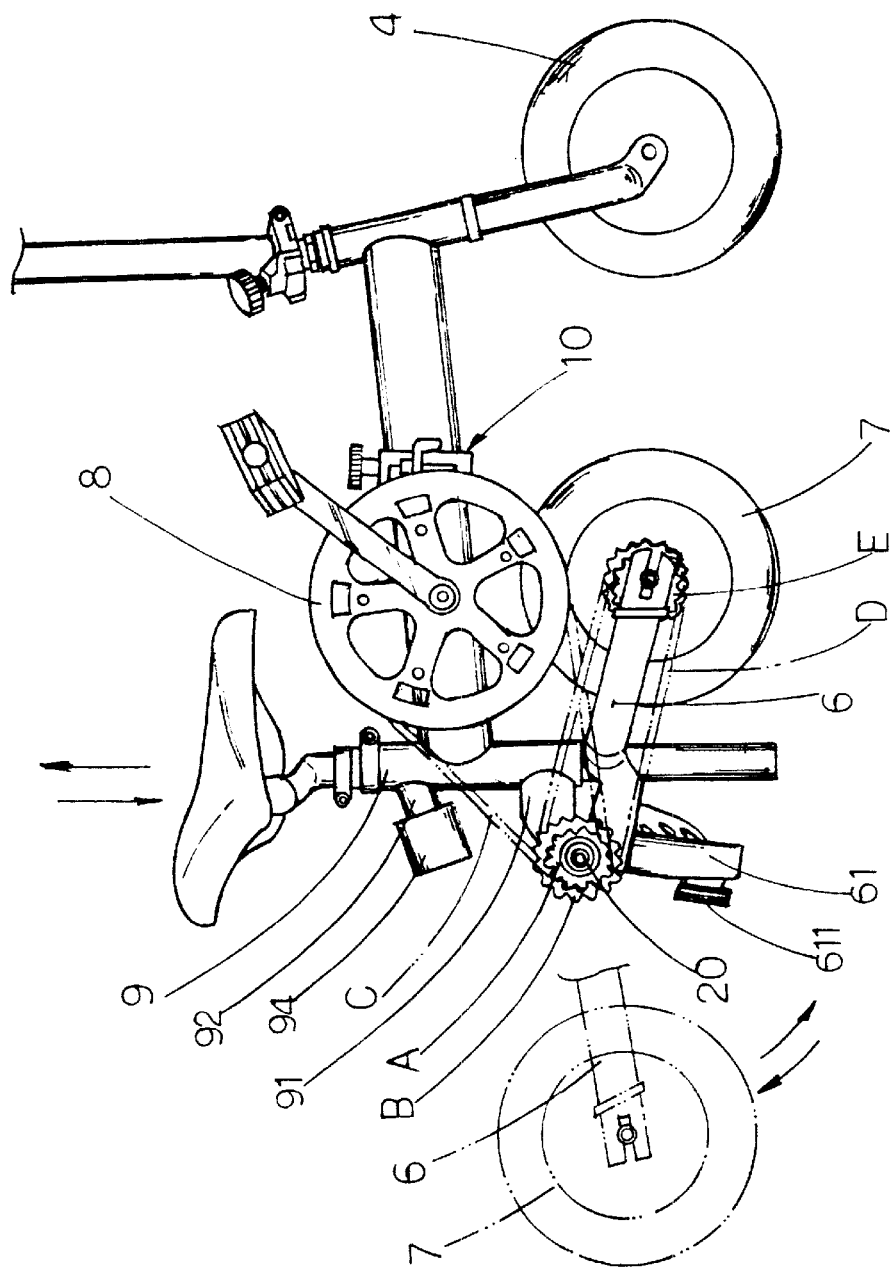
FIG. 4 is an orthographic drawing of the invention herein that illustrates the folding path of the rear wheel.
Figure 5:
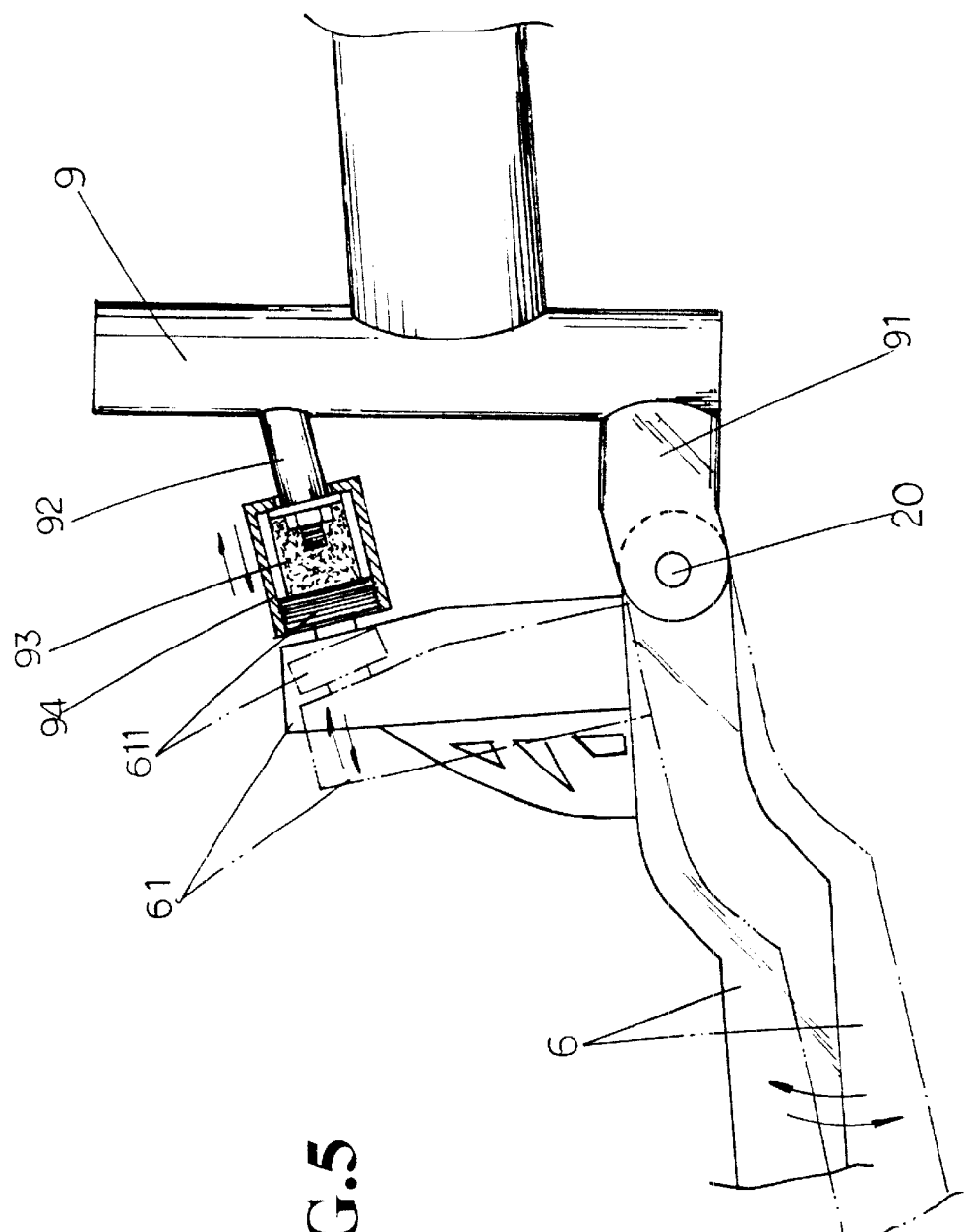
FIG. 5 is an orthographic drawing of the invention herein that illustrates the unfolding and folding path of the chainstays.

Referring to FIG. 4 and FIG. 5, the said second drive shaft 20 is disposed on a first extending arm 91 at the lower end of a seat post 9 which in addition to providing for the positioning of a first driven chain cog A and a second driven chain cog B such that they transfer the motive force of a chainring 8 via a respective chain C and D to a third driven chain cog E, functions as the pivot point of chainstays 6 that provides for their upward and downward excursion; the said chainstays 6 consisting of a locating arm 61 and a cap bolt 611 situated in an end of the locating arm 61 such that when the chainstays 6 are displaced rearward and upward by the rear wheel 7, the said cap bolt 611 stops a cushioning elastic body 93 installed on a second extending arm 92 of the seat post 9 and directly sleeved into the second extending arm 92 and, furthermore, is retained in position against a freely spinning revolving body 94; when the chainstays 6 and the rear wheel 7 are to be folded, since the cap bolt 611 is no longer retained by the revolving body 94, it is capable of being swung downward and forward for folding via the pivot point constituted by the second drive shaft 20, following which the said rear wheel 7 is postured at the lower extent of the chainring 8.

Figure 6:
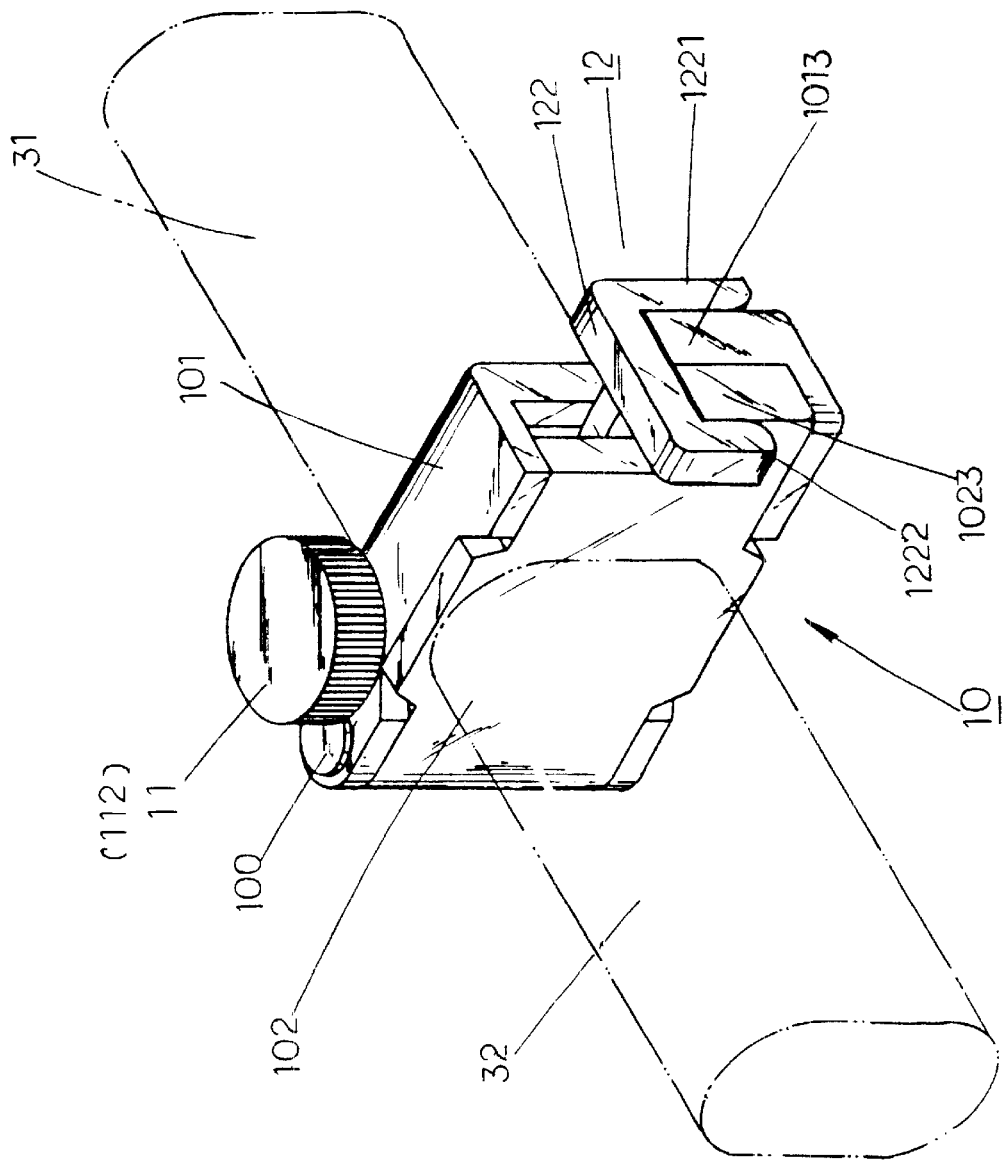
FIG. 6 is an isometric drawing of the invention herein that illustrates the operation of the foldable locking mechanism.
Figure 7:
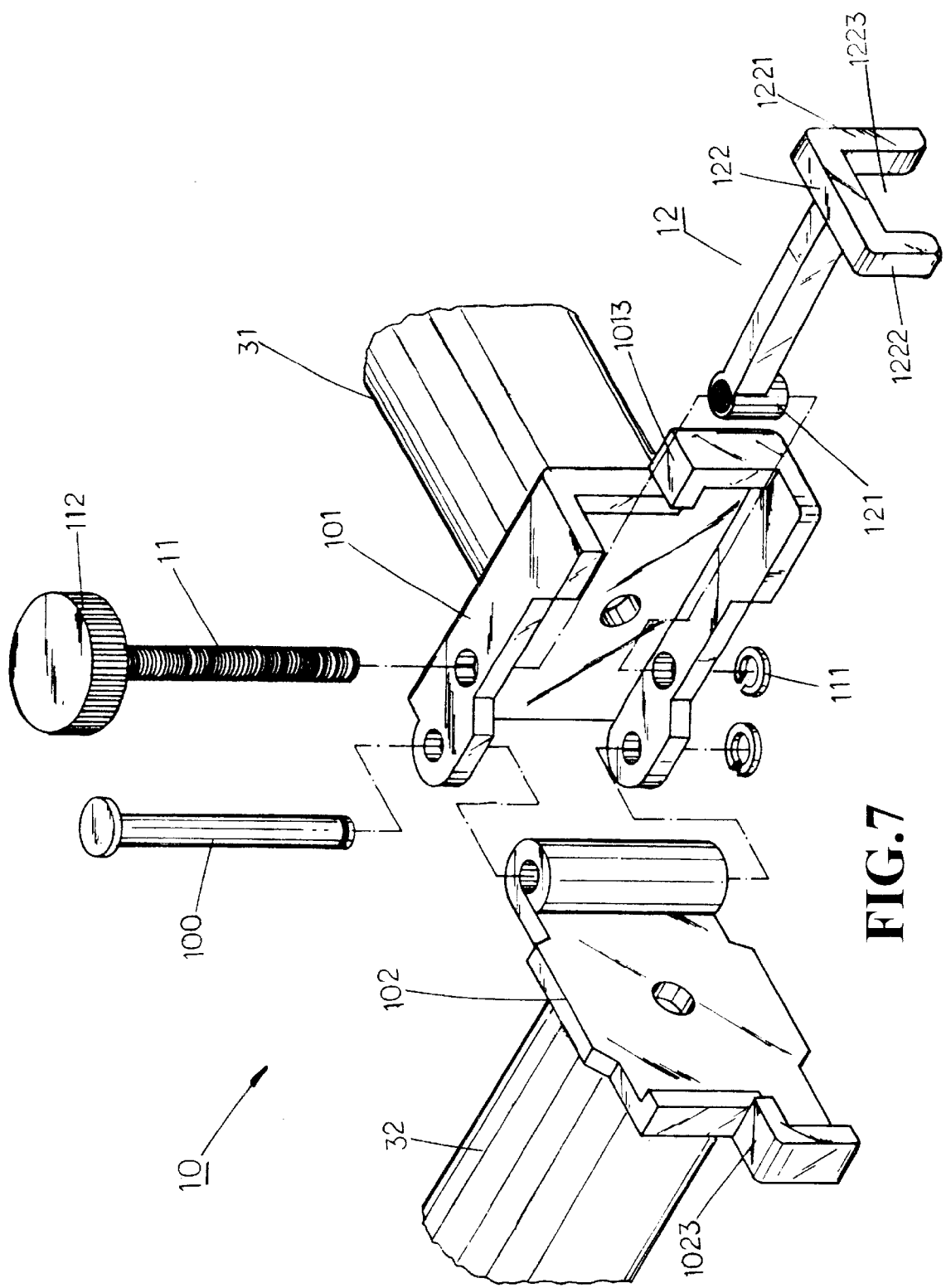
FIG. 7 is an exploded drawing of the foldable locking mechanism of the invention herein.
Figure 8:
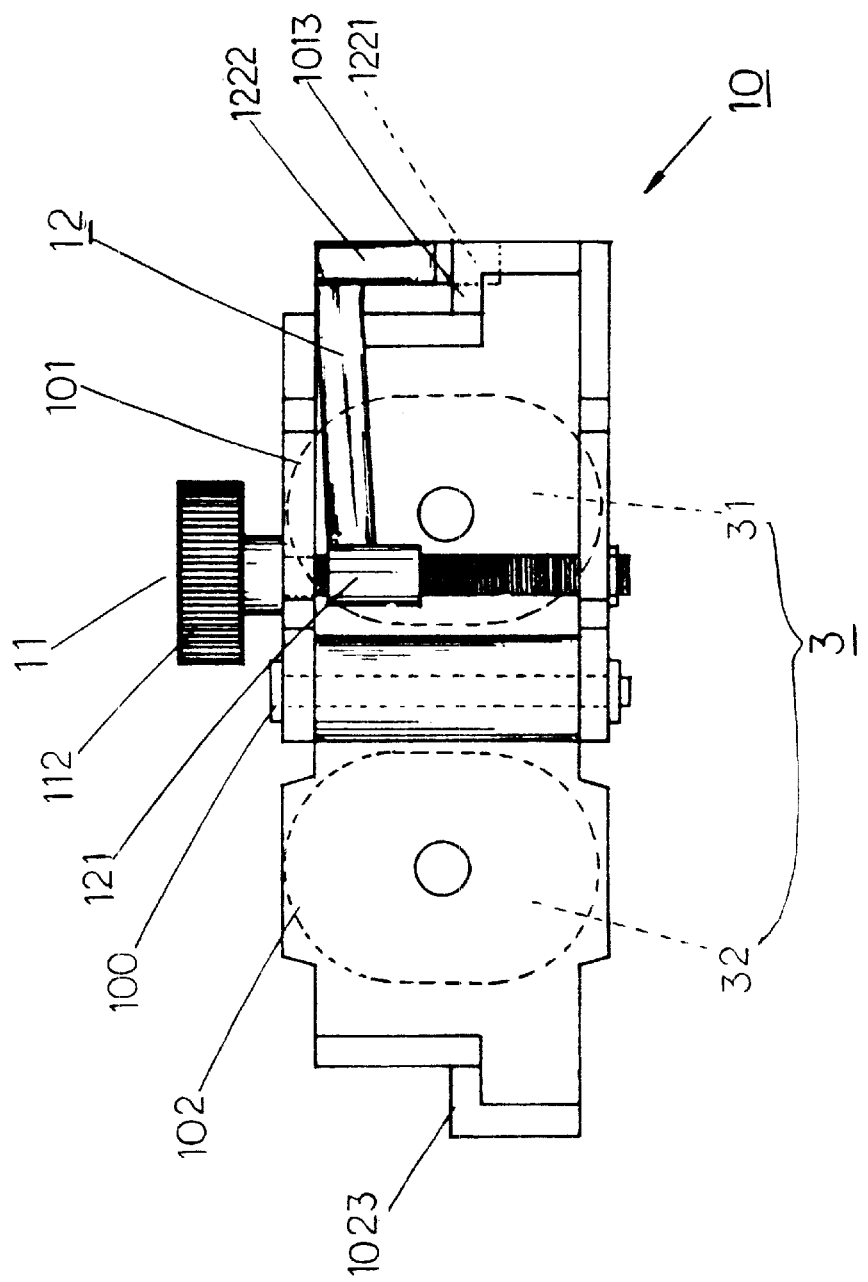
FIG. 8 is an orthographic drawing of the release operation of the foldable locking mechanism of the invention herein.

Referring to FIG. 6, FIG. 7, and FIG. 8, the said foldable locking mechanism 10 positioned on the down tube 3 (or the top tube) is similar to the prior art and consists of a male and a female connector 102 and 101, the male and female connector 102 and 101 respectively disposed at the anterior and the posterior sections 31 and 32 of the down tube 3 (or the top tube) as well as a locating pin 100 linking them together at one end, with the major difference being the respective placement of facing latch steps 1023 and 1013 at the other end of the said female and male connector 101 and 102; an adjustment screw 11 inserted from the top to the bottom through the female connector 101, with a snap ring 111 positioned at the lower extremity of the said adjustment screw 11 that maintains it in a freely rotating state; and, furthermore, a latch bolt 12 fastened onto the said adjustment screw 11, the said latch bolt 12 being of a recumbent L-shape and having a sleeve nut 121 at one extremity that ascends and descends as the adjustment screw 11 is rotated in the female connector 101 and, furthermore, having a latch yoke 122 of an inverted U-shape at the other extremity that extends outward to the position of the latch step 1013, wherein one side of the said latch yoke 122 additionally consists of a longer backing leg 1221 capable of being postured flush against the outer side of the female connector 101 latch step 1013 and the other side consists of a shorter clasping leg 1222 such that when the said male and female connector 102 and 101 are in union, the latch throat 1223 thereby constituted fits down over both of the latch steps 1023 and 1013.

Referring to FIG. 6 and FIG. 8, since the said adjustment screw 11 is inserted from the top to the bottom in the female connector 101, the sleeve nut 121 at one extremity of the said latch bolt 12 is fastened onto the said adjustment screw 11, and the backing leg 1221 of the latch yoke 122 at the other extremity of the latch bolt 12 is postured flush against the outer side of the latch step 1013, when the knob 112 at the top extremity of the adjustment screw 11 is manually rotated, the said latch bolt 12 accordingly ascends or descends to engage the latch step 1013 without any degree of wobble. That is, when the foldable bicycle is to be unfolded into the utilization state, and the female and the male connector 101 and 102 disposed on the down tube 3 (or the top tube) are rotated on the locating pin 100 linking them together and the said latch bolt 12 accordingly ascends or descends as the adjustment screw 11 is rotated to ensconce the latch steps 1023 and 1013 of the female and the male connector 101 and 102, with the downward movement of the latch bolt 12 latch throat 1223 thereby coupling the latch steps 1023 and 1013 of the female connector 101 and the male connector 102 (as indicated in FIG. 6) to effectively ensure that the bicycle unfolded for utilization remains stable and rigid. Conversely, when a bicycle in the unfolded state is to be folded, the adjustment screw 11 is manually rotated such that the said latch bolt 12 is moved upward to release the shorter clasping leg 1222 at one side of the said latch bolt 12 from engagement with the said male connector 102 latch step 1023, thereby enabling the said male connector 102 disposed on the anterior section 31 of bicycle frame down tube 3 (or top tube) to be smoothly swung on the locating pin 100 and folded.

Since the movement of the latch bolt 12 of the invention herein requires the rotation of the adjustment screw 11 to control the ensconcing of the female and the male connector 101 and 102 by downward articulation to effect engagement, and thus differs from the horizontal turning operation of the quick release handle of the prior art, therefore, after the female and the male connector 101 and 102 are coupled, the present invention is unlike the prior art because no loosening occurs due to riding vibration, accidental contact with the quick release handle, and other related factors such that the unfolded bicycle frame effectively remains even more reliably and solidly locked into configuration, thereby providing for safer riding.

Since it is only necessary to directly rotate the adjustment screw 11 to raise or lower the latch bolt 12 and thereby control the engagement or disengagement with the female and the male connector 101 and 102, the actual operation is not only quite simple and convenient, but also requires much less strength to operate than the quick release handle of the prior art.

Since the knob 112 of the said adjustment screw 11 is situated at the exact upper extent of the said female connector 101, the rider can easily and conveniently rotate it while standing to directly control the coupling or decoupling of the male and the female connector 102 and 101, unlike the prior art which requires squatting at the side of the bicycle to turn the quick release handle and, with respect to bicycle users, the utilization of the adjustment screw 11 in the invention herein to afford control over the unfolding and folding of the bicycle obviously meets more requirements of ergonomic operation and provides more operating convenience than the prior art.

Referring to FIG. 9, since the male and the female connector 102 and 101 are coupled or decoupled by rotating the adjustment screw 11 knob 112, which is located at the immediate upper extent of the female connector 101 (i.e., the upper extent of the foldable locking mechanism 10), such that the chainring 8 does not interfere with its operation, the entire said foldable locking mechanism 10 is situated adjacent to the crankarm mounting area (i.e., the chainring center) completely within the circumferential perimeter of the said chainring 8, unlike the prior art which necessitates placement at the front or top and, in terms of actual utilization, this arrangement effectively and, furthermore, significantly reduces the overall physical dimensions of the folded bicycle. The foldable locking mechanism 10 can of course be installed at any position with respect to the design of the frame (including the top tube or the down tube) and can be flexibly reshaped, adapted, and modified in a multiple variety of ways, without chainring location limitations.

Figure 10:
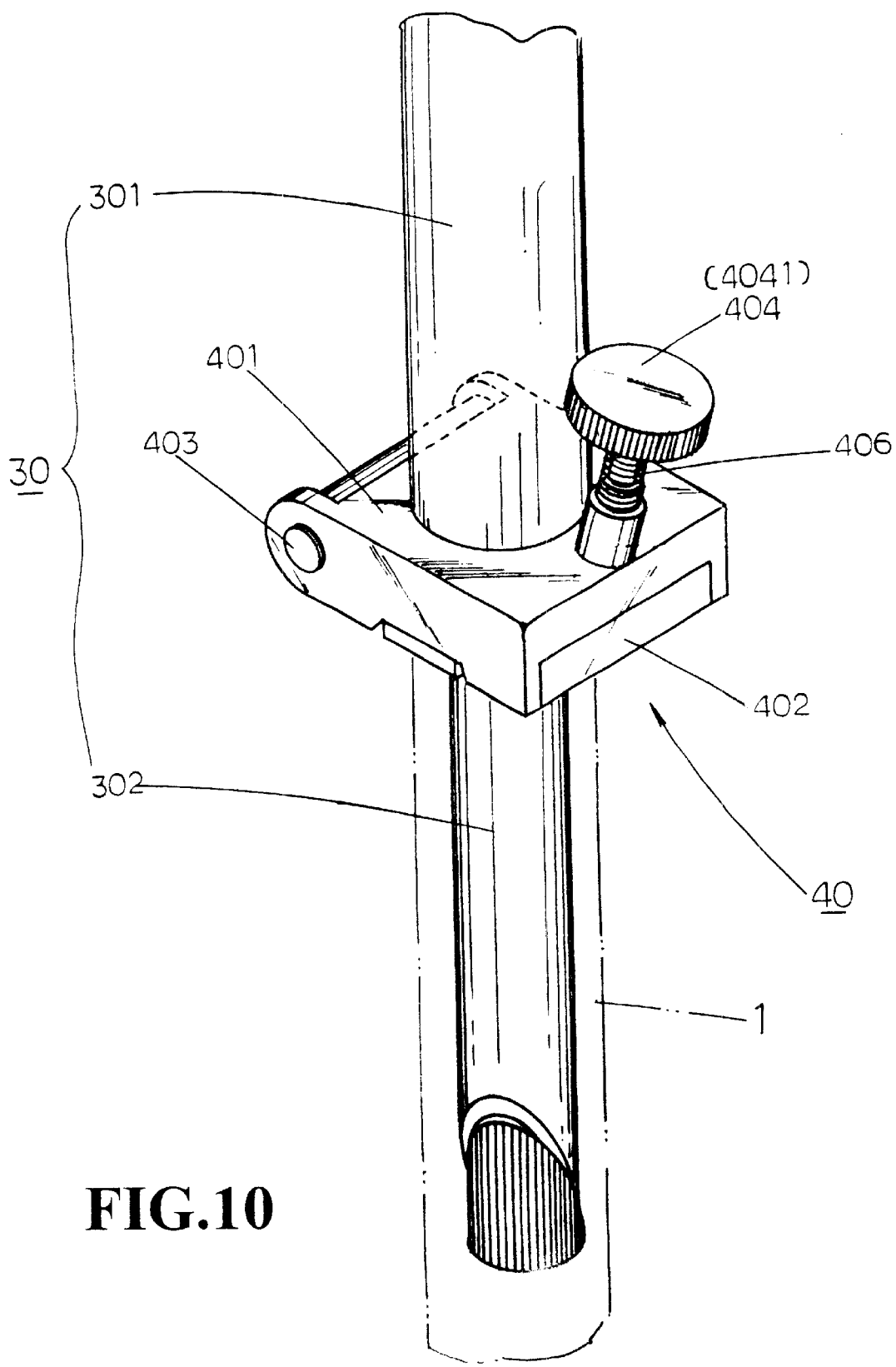
FIG. 10 is an isometric drawing of the extension pipe folding mechanism of the invention herein in the open state.
Figure 11:
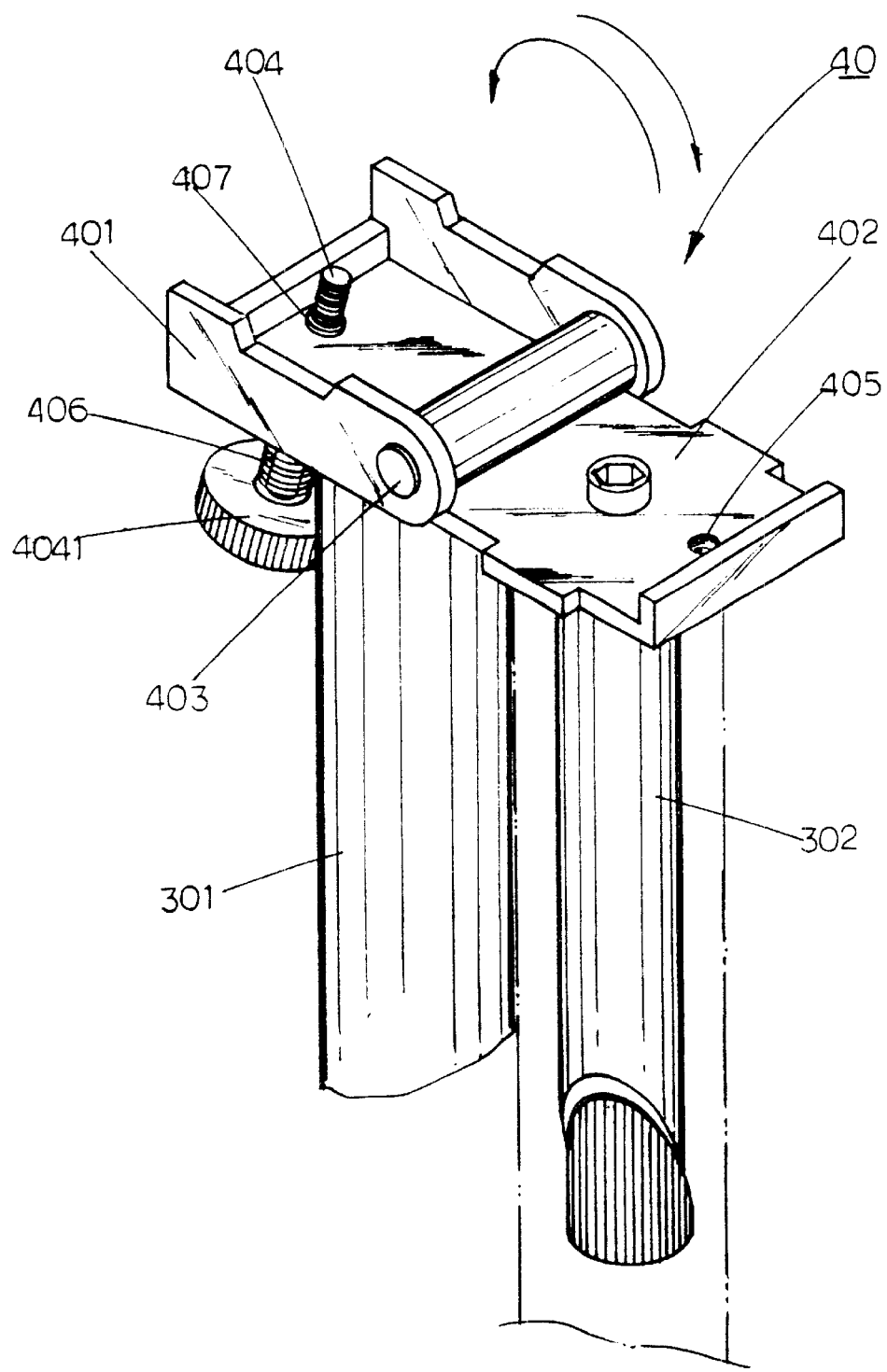
FIG. 11 is an isometric drawing of the extension pipe folding mechanism of the invention herein in the folded state.

Referring to FIG. 3, FIG. 10, and FIG. 11, the said extension pipe 30 has a folding mechanism 40 that enables it to be folded and unfolded, and the said folding mechanism 40 can be equipped with a conventional quick release handle, as shown in FIG. 10 and FIG. 11. As indicated in FIG. 10 and FIG. 11, it consists of two mounting bases 401 and 402 that are respectively disposed at the upper and the lower section 301 and 302 of the extension pipe 30, with the extension pipe upper section 301 providing for the installation of a handlebar stem 50 and the extension pipe lower section 301 fastened in a head tube 1; a rotary shaft 403 that links the said two mounting bases 401 and 402 together and enables the folding and unfolding of the two sections 301 and 302 of the extension pipe 30; and a retaining screw 404 and a nut 405 respectively situated at the end of the rotary shaft 403, with the said retaining screw 404 inserted into the mounting base 401 and, furthermore, preloaded by a spring 406 and positioned by a snap ring 407. As such, when the extension pipe 30 is folded, it is only necessary to rotate the knob 4041 of the retaining screw 404 and thereby unfasten the retaining screw 404 from the nut 405 on the lower mounting base 402, following which the mounting base 401 and the handlebar stem 50 on the said extension pipe upper section 301 are folded down via the rotary shaft 403, which serves as a pivot point; conversely, when the extension pipe upper section 301 are swung upward, the said upper and lower mounting base 401 and 402 are brought into union and the said retaining screw 404 is correspondingly fastened to the nut 405, with the extension pipe 30 handlebar stem 50 also capable of being unfolded when deemed appropriate.

Figure 12:
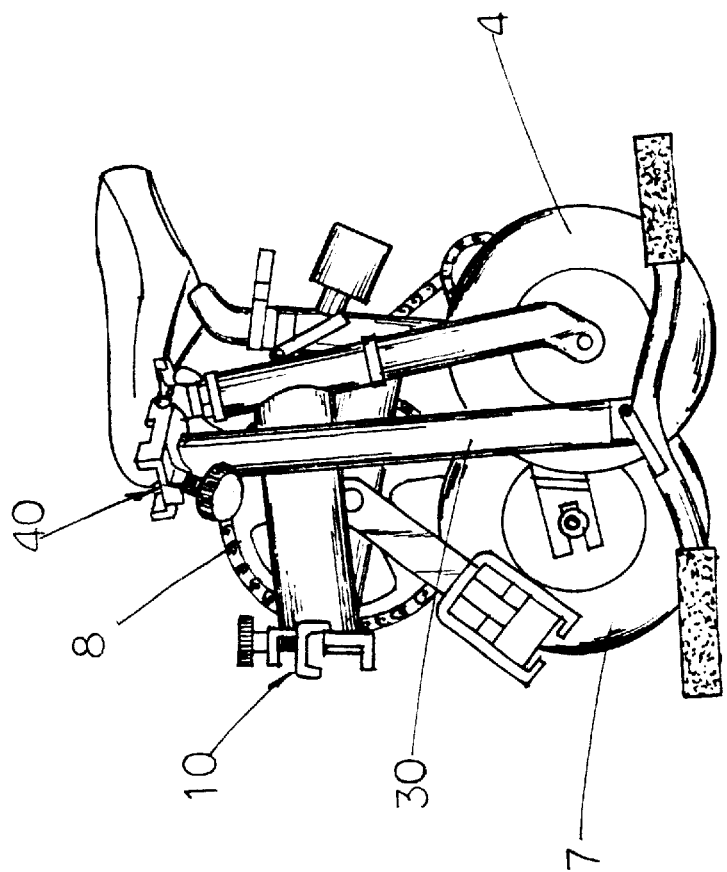
FIG. 12 is an orthographic drawing of the bicycle of the invention herein in the folded state, as viewed from a lateral perspective.
Figure 13:
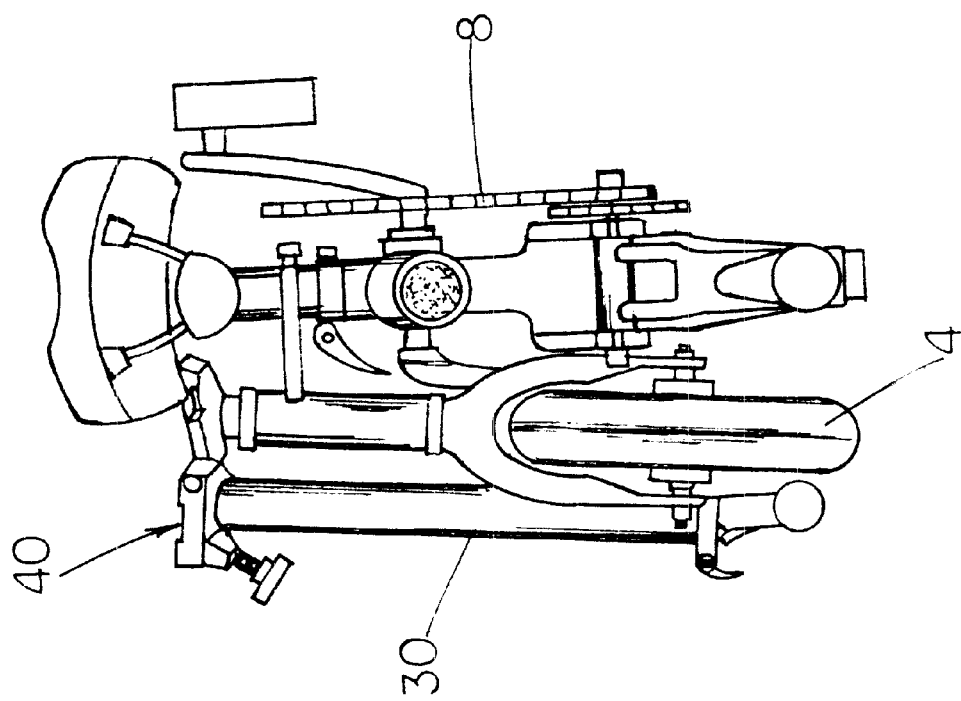
FIG. 13 is an orthographic drawing of the is an orthographic drawing of the bicycle of the invention herein in the folded state, as viewed from an anterior perspective.

Referring to FIG. 3, FIG. 12, and FIG. 13, since the invention herein consists of a bicycle in an unfolded state having a length between the outer edges of the front and a rear wheel 4 and 7 divided into three sections such that after the rear wheel 7 is swung up and down for unfolding and folding on a second drive shaft 20 that serves as a pivot point, the rear wheel 7 is postured at the lower extent of the chainring 8, the foldable locking mechanism 10 positioned on the down tube 3 (or the top tube) that provides for the unfolding and folding of the front wheel 4 is situated adjacent to the five-armed spider area within the circumferential perimeter of the said chainring 8, and the said extension pipe 30 is folded and unfolded coordinatively by the folding mechanism 40, the compound drive foldable bicycle of the invention herein is of significantly reduced overall physical dimensions after it is folded, ensuring more flexibility, conservation of space, and less packaging materials to facilitate storage, placement, and shipping.

What is claimed is:

1. A compound drive foldable bicycle comprising a bicycle in an unfolded state having a length between the outer edges of a front and a rear wheel divided into three sections that provides for swinging the rear wheel up and down for unfolding and folding via a first driven chain cog and a drive shaft serving as a pivot point and thereby posturing the rear wheel at a lower extent of a chainring; furthermore, a foldable locking mechanism is positioned on at least one of a down tube and a top tube which along with an extension pipe provides for unfolding and folding, the foldable locking mechanism situated within the circumferential perimeter of the chainring such that the front wheel is folded to a lower extent of a saddle.

2. The compound drive foldable bicycle as recited in claim 1, wherein the foldable locking mechanism includes a male connector and a female connector movably linked by a locating pin, the male and female connectors respectively having opposed latch steps, an adjustment screw capable of free rotation coupled to the female connector, a knob at a top extremity of the adjustment screw and, furthermore, a latch bolt fastened onto the adjustment screw, the latch bolt being of a recumbent L-shape and having a sleeve nut fastened onto one extremity and a latch yoke of an inverted U-shape at the other extremity that extends to the position of the latch steps disposed on the male and female connector.

3. The compound drive foldable bicycle as recited in claim 2, wherein the latch yoke of the latch bolt includes a longer backing leg along one side capable of being situated flush against the outer side of the female connector latch step and the other side includes a shorter clasping leg to form a latch throat fitting over the latch steps when the male and female connectors are in union, thereby enabling their coupling and decoupling.

* * * * *